May 27, 1958 C. M. ASHLEY 2,836,364

AIR CONDITIONING SYSTEM INCLUDING COMPENSATING MECHANISM FOR THE EFFECTS OF SOLAR RADIATION

Filed April 27, 1953 2 Sheets-Sheet 1

INVENTOR.
Carlyle Martin Ashley
BY Herman Seid
Atty.

May 27, 1958 C. M. ASHLEY 2,836,364

AIR CONDITIONING SYSTEM INCLUDING COMPENSATING MECHANISM FOR THE EFFECTS OF SOLAR RADIATION

Filed April 27, 1953 2 Sheets-Sheet 2

INVENTOR.
Carlyle Martin Ashley
BY
Herman Seid
Atty.

United States Patent Office
2,836,364
Patented May 27, 1958

2,836,364

AIR CONDITIONING SYSTEM INCLUDING COMPENSATING MECHANISM FOR THE EFFECTS OF SOLAR RADIATION

Carlyle Martin Ashley, Fayetteville, N. Y., assignor to Carrier Corporation, Syracuse, N. Y., a corporation of Delaware Application April 27, 1953, Serial No. 351,165

3 Claims. (Cl. 236—1)

This invention relates to air conditioning systems and, more particularly, to an air conditioning system including regulating mechanism to compensate for the effects of solar radiation in the areas of a building structure being conditioned. The term "solar radiation" is used herein to designate the heat load due to sun gain through the windows of the areas being conditioned.

It has been extremely difficult heretofore to compensate satisfactorily for variations in solar radiation in areas of a building structure being air conditioned. In an air conditioning system of the type shown in Carrier Patent No. 2,363,294, granted November 21, 1944, or of the type shown in my Patent No. 2,609,743 granted September 9, 1952, the primary air stream is employed to offset transmission gains or losses through walls, windows, floors and roofs of the structure being conditioned. The water cooling arrangement employed to cool area air (Patent No. 2,363,294) or the secondary air stream supplied to each area (Patent No. 2,609,743) compensates for the internal heat load due to lights, people and solar radiation. While the heat load due to lights and people is usually substantially constant during the day, the load due to solar radiation varies considerably throughout the day. While the solar load to an area being treated is generally proportional to the sun gain through the windows, it is not coincidental. The difference in time between the point where sun gain reaches its peak to the point where solar load to the area being treated is at a peak, is a result of storage effect in the area and may be referred to as the time lag. This time lag creates additional difficulty in satisfactorily compensating for variations in solar radiation without creating uncomfortable conditions in the areas being treated.

The chief object of the present invention is to provide an air conditioning system including regulating mechanism to compensate satisfactorily for variation in solar radiation.

An object of the invention is to provide an air conditioning system in which the temperature or the volume of conditioning medium supplied to the areas being treated is varied in response to the difference between the temperature of exterior air and a temperature produced by the heating effect of solar radiation and exterior air to compensate for the effects of solar radiation in the areas being conditioned.

A further object is to provide a solar radiation compensating system for an air conditioning system which, in response to the difference between the temperature of exterior air and a temperature produced by the heating effect of solar radiation and exterior air actuates the air conditioning system to compensate for variations in solar radiation in the areas being conditioned.

A still further object is to provide a solar compensator for an air conditioning system which reflects the difference between the temperature of exterior air and a temperature produced by the heating effect of solar radiation and exterior air to actuate the system. Other objects of the invention will be readily perceived from the following description.

This invention relates to an air conditioning system for building structures which comprises, in combination, means for supplying a conditioning medium to the areas of the structure to be treated, means for establishing a desired temperature in the areas being treated and means to compensate for the effects of solar radiation in the areas being treated.

This invention further relates to a method of air conditioning a building structure having at least one zone exposed to the effects of solar radiation which consists in the steps of establishing a desired temperature in areas of the zone being treated, and, in response to the difference between temperature of exterior air and a temperature produced by the heating effect of solar radiation and exterior air, varying said temperature to compensate for the effects of solar radiation in said areas.

The attached drawings illustrate a preferred embodiment of the invention, in which Figure 1 is a diagrammatic view of an air conditioning system for a building structure embodying the present invention;

Figure 1:
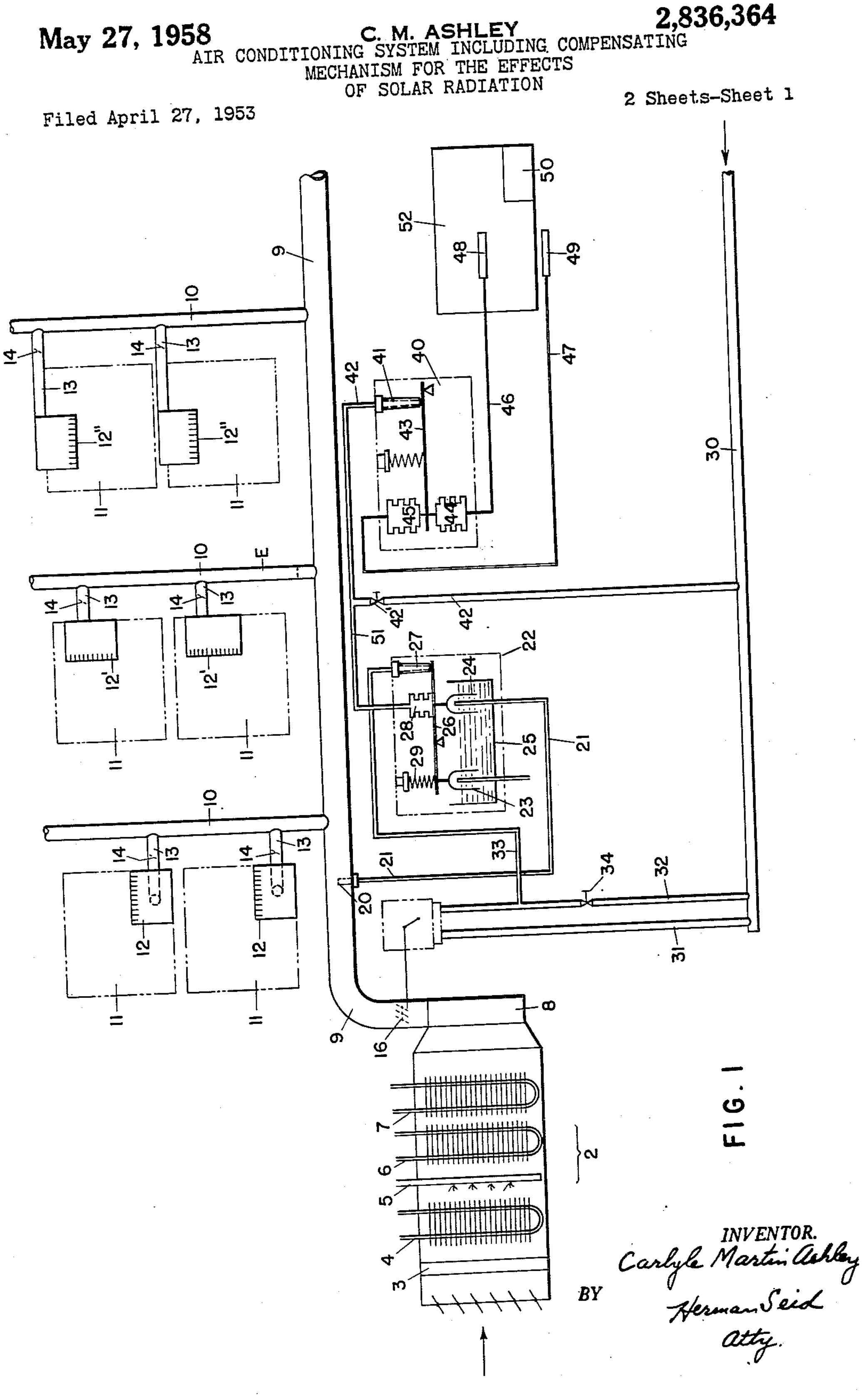
Figure 2:
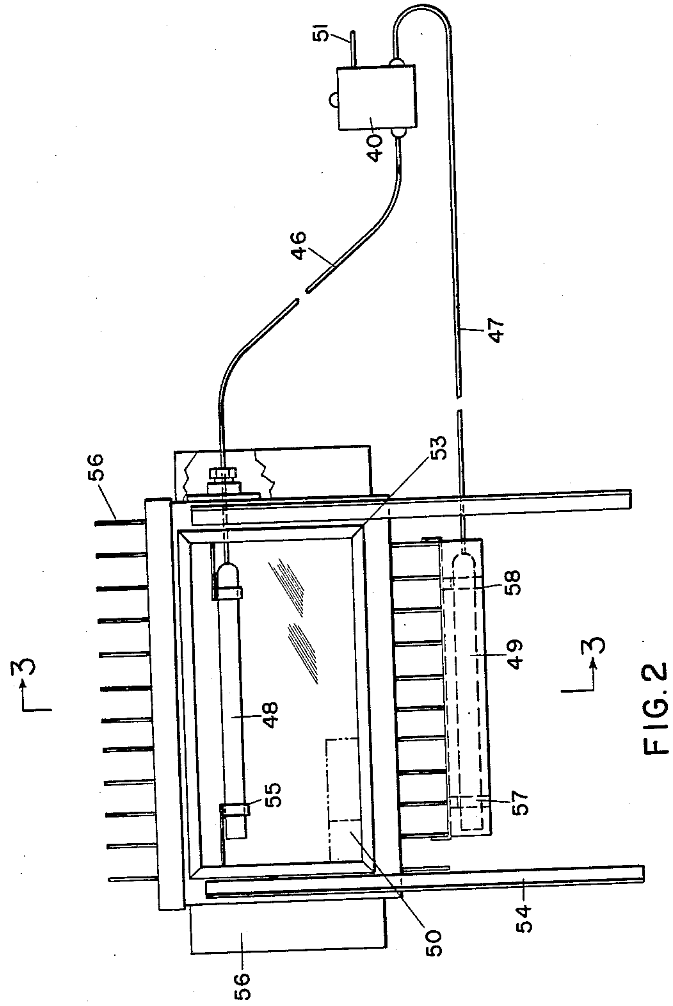
Figure 2 is a view in elevation of the solar compensator.
Figure 3:
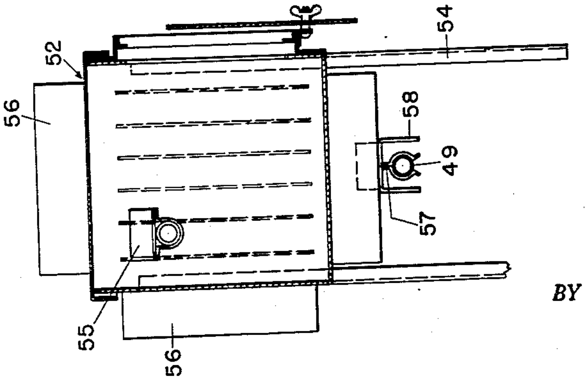
Figure 3 is a sectional view taken on the line III—III of Figure 2.

The attached drawings illustrate diagrammatically an air conditioning system including the present invention employed in a building structure containing a large number of areas to be conditioned. The air conditioning system includes a central station designated generally at 2 to treat the air supplied to the areas to be conditioned. The central station 2 includes a filter 3, a preheating coil 4, sprays 5, a cooling coil 6, and a heating coil 7. A fan 8, draws air from externally of the structure through the various members of the central station. It will be appreciated, return air in any desired proportion, may be mixed with the fresh air and treated in the central station if desired.

Fan 8 passes conditioned air into a header 9, branches 10 leading off from header 9 to the areas 11 to be conditioned. Room units 12, 12′, 12″ are disposed in the areas to be conditioned and are connected to branches 10 by run-outs 13. Dampers 14 are placed in the run-outs 13 as shown to permit the volume of conditioned air passing into any unit to be varied in accordance with conditions within the area being treated. It will be understood that dampers 14 may form a part of the unit if desired. Units 12, preferably, are of the well known induction type; units 12′ may be wall outlets of any desired type; units 12″ may be ceiling units of any well known type.

Dampers 14 may be actuated manually or automatically as desired. As shown, dampers 14 may be actuated manually by an occupant of the area.

Dampers 16 are placed, preferably, in header 9 to regulate the volume of treated air directed into the header by fan 8. Dampers 16 may be placed in any position between the first branch and the fan, if desired, and may be regulated by any suitable means such as a pneumatic motor 17 as hereinafter described.

The ductwork of the system (header 9, branches 10, run-out 13) preferably is designed in accordance with the principle of static pressure regain to provide uniform static pressure at the outlets.

Static pressure in the ductwork is regulated by means of a static pressure regulating system which responds immediately to change in static pressure in the branches to actuate dampers 16 to vary the volume of treated air passing into the header 9 and thence to the branches 10. The static pressure regulating system includes a sensing probe 20 placed in header 9 to reflect a pressure in the header substantially equivalent to static pressure in a branch at any given point. Probe 20 is connected by line 21 to a pressurestat 22.

Pressurestat 22, preferably, is of the well known inverted bell type in which two bells 23, 24 are inverted in a liquid bath 25. The bells are connected to a pivoted lever 26 to move the same toward or from a nozzle 27. Preferably, a bellows 28 is adapted to exert pressure against lever 26 in opposition to the pressure exerted by bell 23. Bellows 28 is connected to a solar compensator as hereinafter described and serves, in effect, to reset pressurestat 22 in accordance with the effects of solar radiation. An adjustable spring 29 also exerts force against lever 26 as shown.

A source of compressed air (not shown) is provided which serves to provide desired air pressure through main air line 30 to the controls. Branch air lines 31, 32 provide desired air pressure to motor 17. A secondary air line 33 connects line 32 to the nozzle 27 of pressurestat 22. A restriction 34 is placed in line 32 to assure application of desired air pressure to motor 17 and through secondary line 33. Line 21 connects probe 20 to bell 24 of pressurestat 22. Bell 23 is open to the atmosphere. Thus, as pressure reflected by probe 20 increases, lever 26 is moved toward nozzle 27 thus increasing pressure in line 33 and increasing the pressure applied to motor 17 to actuate damper 16 to move toward a closed position to decrease the volume of air passing into header 9. Likewise, as pressure reflected by probe 20 decreases, lever 26 is moved from nozzle 27 permitting air to bleed line 33, actuating motor 17 in the reverse direction to move damper 16 toward an open position.

The static pressure regulating system is more fully described and claimed in copending application Serial No. 351,164 filed April 27, 1953.

Preferably, the solar compensating system of the present invention is employed to re-set pressurestat 22 in accordance with solar radiation in the area being conditioned. It will be understood, however, that the solar compensating system may be employed to actuate damper 16 directly or, if desired, may be employed to regulate the temperature of air or water being supplied to the areas being conditioned when the air conditioning systems previously referred to are employed.

In Figure 1, the solar compensating system is shown diagrammatically. This system includes a thermostat 40 containing a nozzle 41 connected by branch air line 42 to line 30. A restriction 42' is placed in line 42. A pivoted lever 43 opens and closes nozzle 41. Lever 43 is actuated by means of bellows 44, 45 connected by capillary tubes 46, 47 to bulbs 48, 49. Bulb 48 is placed in a solar radiation box as hereinafter described so that it reflects a temperature produced by the heating effect of solar radiation and exterior air while bulb 49 is suspended below the box so that it reflects exterior air temperature. The thermostatic ssytems contain the usual liquid "fill." Electronic instruments may be used, if desired, to sense the difference between exterior air temperature and temperature within the box.

Storage material 50 may be placed in the solar radiation box to give the same time lag or storage effect as exists in the areas being conditioned. Thermostat 40 is actuated in response to the temperature difference between the two thermostatic systems. Variations in the amount of storage material placed in the box alters or corrects for the difference in temperature between bulbs 48, 49 so that this difference is directly proportional throughout the day to the amount of heat that need be absorbed by the cooling system.

The temperature difference between the interior of the solar radiation or compensator box is approximately proportional to the amount of effective heat received in the corresponding zone of the building by solar radiation. Due to the substantially constant value of conductance between the interior of the box and the exterior air, the box serves in effect as a heat meter to measure by its temperature difference the intensity of solar radiation received.

When the nozzle 41 of thermostat 40 is closed, air pressure increases in secondary line 51 which connects the bellows 28 of pressurestat 22 to the solar compensating system thus increasing the pressure applied against lever 26 in opposition to the pressure applied thereagainst by inverted bell 24 to urge lever 26 to move away from nozzle 27 of thermostat 22 thereby resetting the pressurestat in accordance with the solar radiation as reflected by the solar compensating system. Nozzle 27 bleeds air from line 33 decreasing the pressure applied to motor 17 to actuate damper 16 to move toward an open position.

The solar compensating system includes a solar regulator which is placed on the roof of the structure being conditioned facing in the same direction as the zone of the structure being air conditioned. The solar regulator includes an insulated box 52 having a window 53 in one side thereof facing in the same direction as the windows of the zone being treated. The box is supported by legs 54. Bulb 48 is clamped as shown at 55 within the interior of box 52. Preferably, fins 56 are provided on the exterior of the box in order that the absorbed solar radiation on the box surface may be dissipated effectively. Bulb 49 is clamped at 57 below box 52. Preferably, bulb 49 is surrounded by a shield 58 to obviate the effects of solar radiation thereon. The bulbs 48, 49 are connected by capillary tubes 46, 47 as previously described to thermostat 40.

Preferably, in order to compensate for the time lag between peak temperature of solar radiation and peak room temperature caused by the storage effect of the heat capacity of the building interior (walls, floors, ceilings), furniture, etc. within the area being conditioned suitable storage material 50 is placed within box 52. The amount or volume of storage material 50 placed within box 52 should produce a time lag in box temperature substantially equivalent to the time lag due to the storage effect encountered in the areas being conditioned.

Considering the operation of the air conditioning system of the present invention, exterior or fresh air is drawn into central station 2, filtered, cooled or heated, dehumidified or humidified as required, and passed into the header 9 by fan 8. Changing pressure in header 9 caused by decreasing or increasing supply of conditioned air to various areas is sensed by probe 20 reflecting a pressure substantially equivalent to static pressure in a branch at point E. The change in pressure sensed by probe 20 affects pressurestat 22 to actuate motor 17 to move the damper 16 thus decreasing or increasing the volume of conditioned air passing through header 9, thereby maintaining a desired static pressure in the branches 10 to maintain substantially constant the volume of conditioned air supplied to a particular unit regardless of adjustment of other units during operation of the system.

The pressurestat 22 is reset in accordance with variations in solar radiation. Thermostat 40 is responsive to the difference in a temperature produced by the heating effect of solar radiation and exterior air sensed by bulb 48 and the temperature of exterior air sensed by bulb 49. When the nozzle 41 is closed, air pressure increases in secondary line 51 which connects the bellows 28 of pressurestat 22 to thermostat 40. This increases the pressure applied against lever 26 in opposition to the pressure applied thereagainst by inverted bell 24 to urge lever 33 to move away from nozzle 27 thereby resetting the pressurestat in accordance with the solar radiation as reflected by the solar compensating system.

It will be appreciated it is not necessary to employ the solar compensating system with the static pressure reguating system herein described since it may be employed o regulate the damper 16 directly if desired. If de- ;ired, it may be employed to actuate other controls in other types of air conditioning systems. This solar com- pensating system may serve as a control system per se or may serve as a reset control for various types of regu- lators.

It will be appreciated, as explained above, that the solar compensator may be employed in an air conditioning system of the type shown in Patent No. 2,363,294 to vary the temperature or volume of a conditioning medium such as water supplied to the areas being treated. It will also be appreciated that, if desired, the storage effect can be applied in the air line by means of a tank and an orifice instead of employing storage material in the solar compensating box.

The present invention provides an air conditioning system in which the effects of solar radiation are compensated by means of a simple and effective control. The solar compensating system of the present invention effectively compensates for the effect of solar radiation in the areas of a building structure being air conditioned. Such system reflects the solar radiation as received in the area being treated enabling more effective control to be maintained. In addition, the present invention provides storage material in the solar compensator itself, thereby closely approximating the effects of storage in the areas being conditioned. It will be understood a solar compensator control preferably is used in each zone or exposure of the building where the solar radiation load is a major portion of the room load.

While I have described a preferred embodiment of the invention, it will be understood the invention is not limited thereto since it may be otherwise embodied within the scope of the following claims.

I claim:

1. In an air conditioning system for building structures, the combination of a central station for treating air for supply to areas to be conditioned, units in at least some of the areas being conditioned to supply conditioned air to the areas, duct work connecting the central station and the units, means to supply treated air to the units through the duct work, mechanism for varying the volume of air supplied to the units and a solar compensating system to actuate said mechanism to compensate for the effects of solar radiation in the areas being treated, said solar compensating system comprising a responsive member connected to said mechanism a box having a window therein through which the heat of solar radiation enters the box, a thermal system including a bulb exposed in the box, said responsive member being connected to said bulb, said bulb being responsive to a temperature produced by the heating effect of solar radiation and exterior air, a second thermal system including a second bulb exposed to the temperature of exterior air and connected to the responsive member, said member responding to the difference between the temperatures reflected by said bulbs.

2. An air conditioning system according to claim 1, in which storage material is placed in the box of the solar compensating system to store some portion of the heat within the box.

3. In an air conditioning system for building structures, the combination of a central station for conditioning air for supply to areas to be conditioned, units in at least some of the areas being conditioned to supply conditioned air to the areas, a header connected to the central station, means to provide a predetermined volume of air to the header, branches connected to the header, runouts connecting the branches with the units, means for maintaining the volume of conditioned air supplied to a unit substantially constant regardless of adjustment of other units, and means to reset the volume maintaining means in accordance with variations in solar radiation, said reset means comprising a box having a window therein through which the heat of solar radiation enters the box, a responsive member connected to said volume maintaining means, a thermal system including a bulb disposed in the box connected to the responsive member, said bulb being responsive to a temperature produced by the heating effect of solar radiation and exterior air, a second thermal system including a second bulb exposed to the temperature of exterior air and connected to the responsive member, said member responding to the difference between the temperatures reflected by said bulbs to reset said volume maintaining means.

References Cited in the file of this patent

UNITED STATES PATENTS

| | | |
|---|---|---|
| 1,289,435 | Fulton | Dec. 31, 1918 |
| 1,538,606 | Amdursky | May 19, 1925 |
| 1,641,170 | Karlson | Sept. 6, 1927 |
| 1,698,191 | Gaines | Jan. 8, 1929 |
| 1,934,133 | Lauderback | Nov. 7, 1933 |
| 2,000,739 | Bristol | May 7, 1935 |
| 2,043,834 | Marbury | June 9, 1936 |
| 2,055,988 | Stacey et al. | Sept. 29, 1936 |
| 2,263,422 | Harris | Nov. 18, 1941 |
| 2,274,774 | Chambers | Mar. 3, 1942 |

FOREIGN PATENTS

| | | |
|---|---|---|
| 888,944 | France | Sept. 20, 1943 |